United States Patent [19]

Tribble-DuBose

[11] Patent Number: 4,633,536
[45] Date of Patent: Jan. 6, 1987

[54] COLLAPSIBLE POTTY CHAIR WITH DISPOSABLE BAG

[76] Inventor: Bobby J. Tribble-DuBose, 7876 Hillmont Dr., Oakland, Calif. 94605

[21] Appl. No.: 567,997

[22] Filed: Jan. 4, 1984

[51] Int. Cl.[4] .......................... A47K 11/02; E04H 1/12
[52] U.S. Cl. ........................................... 4/460; 4/449; 4/144.2; 4/479
[58] Field of Search ................ 4/144.3, 449, 460, 452, 4/538, 453, 479, 144.2

[56] References Cited

U.S. PATENT DOCUMENTS

| | | | |
|---|---|---|---|
| 1,080,930 | 12/1913 | Schierding | 4/449 |
| 1,563,236 | 11/1925 | Smith | 4/460 |
| 1,567,484 | 12/1925 | Beard | 4/460 X |
| 2,974,321 | 3/1961 | Salka | 4/476 |
| 3,771,493 | 11/1973 | Chandor | 4/452 X |
| 3,799,228 | 3/1974 | Crawford | 4/538 X |
| 4,020,843 | 5/1977 | Kanall | 4/144.3 X |

Primary Examiner—Henry K. Artis
Attorney, Agent, or Firm—Townsend and Townsend

[57] ABSTRACT

A potty chair having a seat member a central opening therethrough. A number of spaced legs are pivotally mounted on the seat member and move from extended position for supporting the seat member on a surface therebelow to collapsed positions along the bottom of the seat member. The seat member itself is formed of two parts which are hinged together and which fold into a compact form to fit in a small space or a carrying case. The legs are held in position along the bottom surface of the seat member when the two parts of the seat member are folded into their compact, side-by-side position. The seat member has spaced projections which extend toward the center of the opening and are adapted to extend into spaced holes near the upper, open top of a flexible, disposable bag, whereby the bag is aligned with and depends from the central opening to receive human wastes when a child sits on the seat member. The legs can be of telescoping parts to increase their lengths to permit the seat member to be at different heights above the support surface therebelow.

6 Claims, 9 Drawing Figures

COLLAPSIBLE POTTY CHAIR WITH DISPOSABLE BAG

BACKGROUND OF THE INVENTION

1. Field of the Invention

This invention relates to improvements in potty chairs for use by small children and, more particularly to a collapsible potty chair having a bag which can be disposed of after use with the potty chair.

2. Description of the Prior Art

Potty chairs of various designs and size have been known in the past for use by small children. For the most part, conventional potty chairs have been of fixed construction and typically employ a reuseable container for receiving human wastes. While such conventional potty chairs are satisfactory in many situations. The potty chair provides clean, sanitary facilities for a toddler when away from home or during cross-country travel where toilet facilities are not available. A need has therefore continued to exist for a potty chair which can be suitably collapsed to a compact form and shape, yet the potty chair is provided with waste collection means which can be quickly and easily disposed of after each use of the potty chair. The present invention satisfies this need.

Prior U.S. Patent relating to the present invention include U.S. Pat. No. 3,061,840, and 3,628,197.

SUMMARY OF THE PRESENT INVENTION

The present invention provides a collapsible potty chair which uses a flexible, disposable bag for collecting human wastes. The potty chair is especially suitable for use by small children; however, it could be used for older children and adults, if necessary.

The potty chair includes a seat member formed of two hingedly coupled parts which define a central opening through the seat member when the parts are in horizontal, side-by-side positions with respect to each other. The parts carry pivotally mounted legs which swing away from the seat member into extended positions for supporting the seat member above a support surface therebelow. When the legs are collapsed, they nestle in a space below the upper surface of the seat and allow the two parts of the seat member to fold into abutting, face-to-face relationship for storage. A handle at the ends of the two parts of the seat member allows the collapsed potty chair to be hand carried from place to place. Also, the potty chair is sufficiently small when collapsed to fit into a carrying case or to rest on a shelf while requiring a minimum of space.

The seat member has a bag mounting means near the central opening. A preferred embodiment of this mounting means includes a number of spaced projections extending into the central opening so that a collapsible bag can be mounted on the seat member and depend therefrom in vertical alignment with the central opening. The bag has holes which receive the projections, and one form of the bag has a drawstring which can be pulled to close the open top of the bag to seal the contents therein. Other seal means can be provided, if desired. The bag can be of plastic material so as to be inexpensive and readily disposable.

The primary object of the present invention is to provide a collapsible potty chair for use with a disposable bag capable of being removably coupled to the potty chair wherein the potty chair can be collapsed and expanded quickly and easily and the bag can be placed on or taken off the potty chair and disposed of in a sanitary manner or placed in a nylon tote bag designed to carry the chair and new and used disposable plastic bags.

Other objects of this invention will become apparent as the following specification progresses, reference being had to the accompanying drawings for an illustration of the invention.

IN THE DRAWINGS

DETAILED DESCRIPTION OF THE PREFERRED EMBODIMENT

Figure 1:
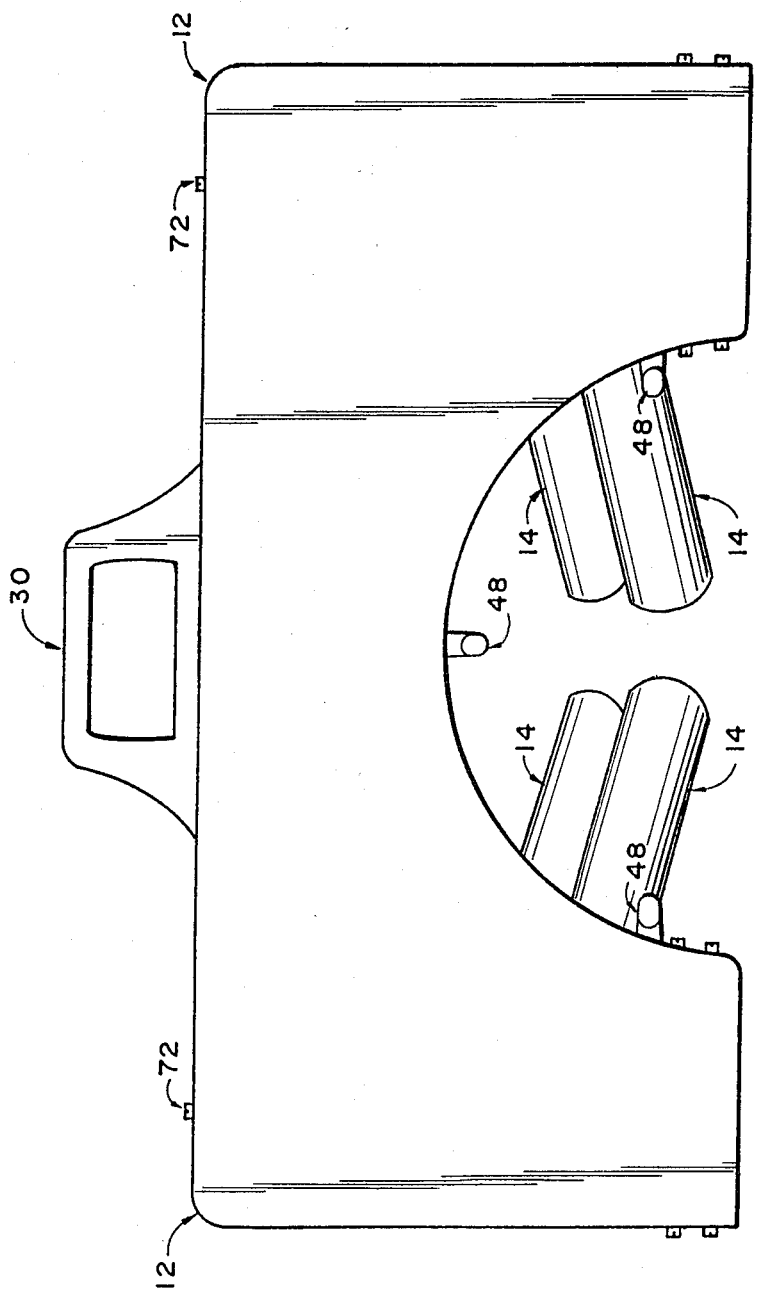
FIG. 1 is a side elevational view of the collapsible potty chair of the present invention showing the way in which the potty chair is in a collapsed position and sufficiently compact to fit into a purse-size carrying case.

The potty chair of the present invention is broadly denoted by the numeral 10 and includes a seat member 12 mounted on four legs 14 at the corners of the seat member, the seat member typically being generally square or rectangular in plan form. The seat member has a central opening or hole 16 therethrough and a disposable bag is adapted to be coupled with bag mounting means 18 carried by seat member 12 within opening 16, whereby liquid and solid wastes can be collected in the bag by a person sitting on the seat member when the legs 14 rest on the floor or other support surface therebelow. After use of the potty chair, the bag can be removed from the mounting means 18 and the bag and its contents can then be disposed of in a sanitary manner. The potty chair can then be folded into a compact form as shown in FIG. 1 and stored on a shelf or in a purse-size carrying case. In such a carrying case, the potty chair can be easily carried from place to place because it is lightweight and compact in size. Moreover, the bags associated with the potty chair can be of flexible, plastic material so that they can be folded into a small size and also carried with the potty chair without adding any appreciable weight and requiring substantially no space.

Figure 2:
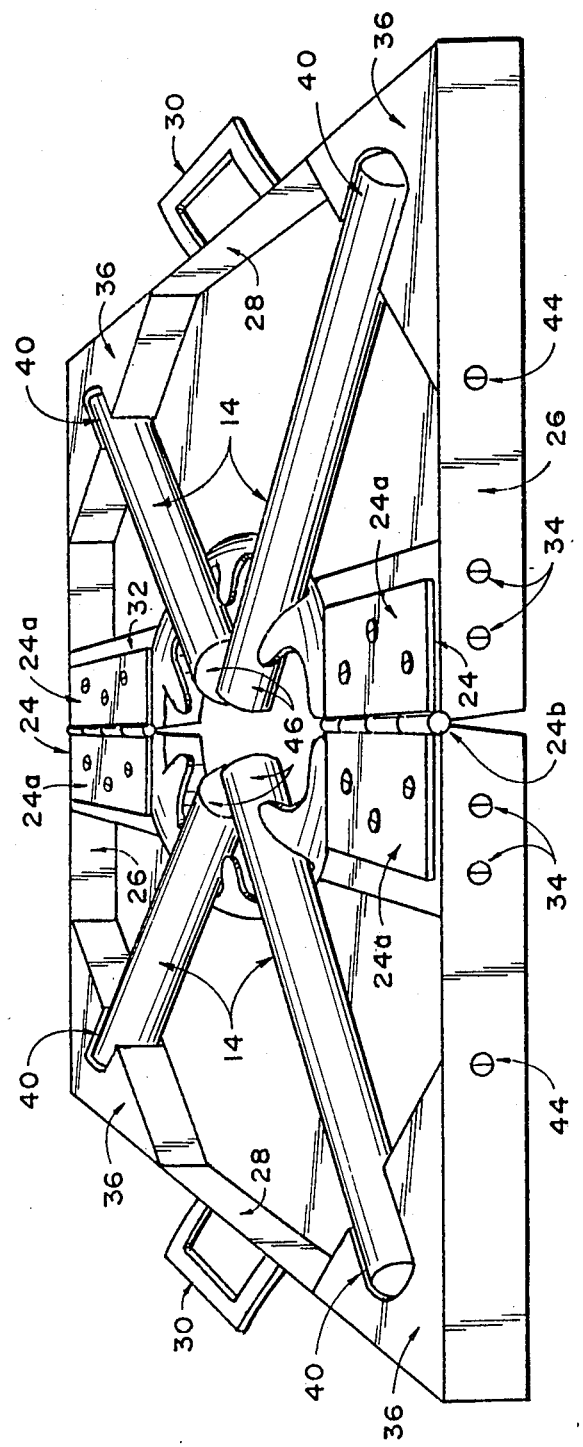
FIG. 2 is a perspective view of the bottom of the potty chair in one stage of its expansion into an operative position.
Figure 3:
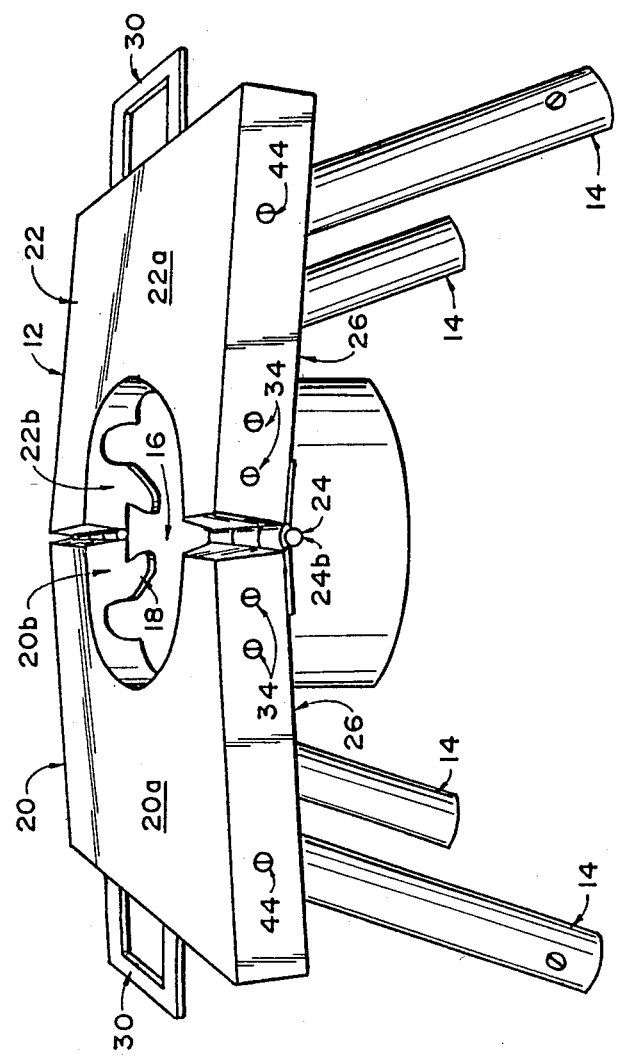
FIG. 3 is a perspective view looking from front to rear thereof and showing the chair in a final stage of expansion into its operative position.

Seat member 12 includes a pair of panels 20 and 22 which are connected by hinges 24 for hinged movement from collapsed side-by-side positions as shown in FIG. 1 to expanded, generally co-planar positions as shown in FIGS. 2 and 3. Panels 20 and 22 can be of any suitable material, but preferably they are of plastic material which can be molded with side walls 26 and end walls 28 (FIG. 2), the side and end walls being integral with each other and with panels 20 and 22. Handles 30 are also formed in an integral fashion with end walls 28, and the handles mate with each other as is shown in FIG. 1 when the potty chair is collapsed. Thus, the handles 30 can form a single handle and can be used to carry the potty chair in its collapsed condition or handles can be made so that they recess inside the carrying case and used as needed.

Panels 20 and 22 have upper surfaces 20a and 22a which form the surface on which a child sits during use of the potty chair. Surfaces 20a and 22a are flat and become co-extensive when the potty chair is fully expanded and ready for use. FIG. 2 shows seat member 12 fully expanded; whereas, FIG. 3 shows platform 12 almost fully expanded, and also shows the slight inclination of surfaces 20a and 22a immediately before the surfaces become co-extensive with each other.

Hinges 24 are mounted on adjacent blocks 32 which are secured by screws 34 to seat member 12, blocks 32 having flat lower faces on which the hinge plates 24a of hinges 24 are secured. The hinge pins 24b of hinges 24 are aligned with each other so that the hinges define a common hinge axis. When the platform is fully expanded, the hinge plates 24a of each hinge 24 are co-planar; whereas, when the platform is in a collapsed condition as shown in FIG. 1, the hinge plates 24a of each hinge 24 are in side-by-side relationship to each other.

Seat member 12 is provided with corner blocks 36 (FIG. 2) which are generally triangular in shape. Each corner block has a recess 38 for receiving an end 40 of a respective leg 14. A pin 42 secured at the ends thereof by screws 44 is carried by each block 36, respectively, and the pins 42 pivotally mount legs 14 for movement from collapsed positions as shown in FIG. 2 to extended positions as shown in FIG. 3. The opposite ends of legs 14, denoted by the numerals 46, meet at a common location within opening 16 as shown in FIG. 2 when the legs are collapsed. Only a single pin 42 is shown for purposes of simplifying the drawings.

Each panel 20 or 22 has a semicircular hole or cutout which mates with the similar cutout of the other panel to form opening or hole 16 (FIG. 3). Each semicircular cutout is denoted by the numeral 16a as shown in FIG. 1. Each of the panels 20 and 22 has a semicircular wall 20b and 22b, respectively, which extends downwardly from the upper surfaces 20a and 22a. Each of walls 20b and 22b has a lower margin provided with several rigid, lateral projections or tabs 48 which extend into hole 16 and define bag mounting means 18. These tabs have pointed outer ends and typically are in a common, generally horizontal plane when the seat member 12 is fully expanded.

Figure 4:
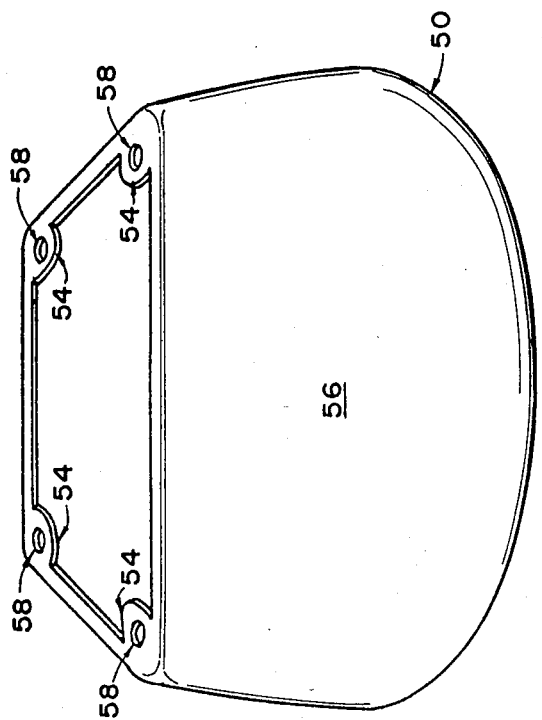
FIG. 4 is a perspective view of one embodiment of a disposable bag for use with the potty chair of FIGS. 1-3.

Tabs 48 are adapted to be coupled to a disposable bag which depends from the tabs and is aligned with opening 16. One embodiment of the bag is shown in FIG. 4 and denoted by the numeral 50. The bag is of flexible, preferably plastic material which is inexpensive to produce and can be easily disposed of. The bag has a top opening 52 and a plurality of projections 54 integral with the sidewall 56, each projection 54 having a hole 58 therethrough for receiving a respective tab 48.

The bag 50 is manually placed on projections 48 by causing tabs 48 to enter holes 58 of projections 54. For purposes of illustration, only four such projections 54 are shown in FIG. 4; however, it is to be understood that there will be a sufficient number of tabs 48 and projections 54 so that the bag 50 will be properly suspended below platform 12 with open top 52 in alignment with opening 16 in the seat member 12.

Legs 14, when expanded, generally are slightly inclined and over center with reference to their pins 42 for proper support of a child on the potty chair. Each leg 14 can have a telescoping inner part and provided with a detent 60 to allow the inner part to extend outwardly from the outer end of leg 14 to increase the length of the leg. Thus, this feature allows the potty chair to be used by persons older than small children inasmuch as the increase in length of the legs 14 allows seat member 12 to be arranged at a height more suitable for older children and even adults.

Figure 5A:
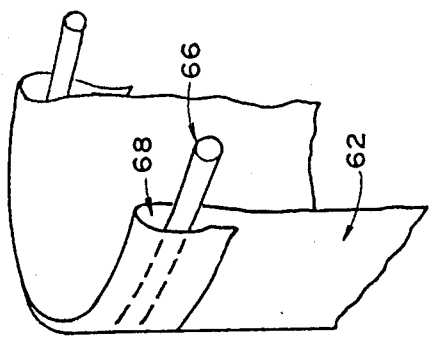
FIG. 5a is a perspective view of a portion of the upper end of the bag of FIG. 5.
Figure 5:
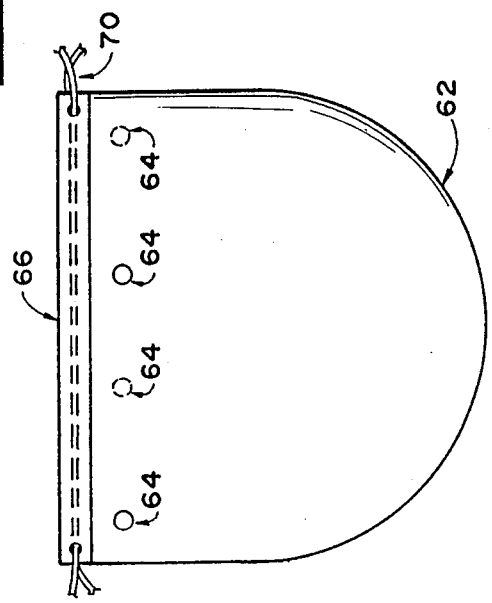
FIG. 5 is a side elevational view of another embodiment of a disposable bag for use with the potty chair, the bag having a drawstring at the upper end and surrounding the upper top thereof.

Another embodiment of the bag of the present invention is broadly denoted by the numeral 62 and is illustrated in FIGS. 5 and 5a. Bag 62 is preferably of plastic, throw-away material which is normally flat and flexible and is provided with holes 64 near the upper, open top thereof whereby tabs 48 can be inserted into the holes to cause the bag to be suspended by seat member 12 in alignment with central opening 16. Bag 62 also has a drawstring 66 in a passage 68 formed by doubling the material of the bag on itself and heat sealed or otherwise secured to confine the drawstring. The ends 70 of the drawstring extend outwardly from the bag and can quickly be pulled to close the bag when the bag is removed from the potty chair and sealed so as to be ready for disposal. Other bag closure means may be used, if desired.

In operation, assuming the potty chair is in the collapsed condition of FIG. 1, the two panels 20 and 22 of the seat member 12 are typically held together by hasps 72. To expand the potty chair, the hasps 72 are released, the panels 20 and 22 are swung apart and placed in the positions shown in FIG. 2. Then, the legs are pulled outwardly from their collapsed condition so that they pivot about the pins 42 and extend outwardly from blocks 36. Then the seat member is inverted and the legs are placed on the floor, following which a bag is coupled to tabs 48 so that the open top of the bag is aligned with opening 16. The chair is then ready for use and a child sitting on seat member 12 can eliminate into the bag.

After use of the potty chair, the bag can be removed from tabs 48 and the bag can be properly disposed of. If the bag is of the type shown in FIGS. 5 and 5a, the drawstrings of the bag can be pulled to close the open top of the bag. After use, the potty chair can then be returned to its collapsed position as shown in FIG. 1 by reversing the steps mentioned above for expanding the potty chair. The potty chair can then be quickly and easily put on a shelf or stored in a carrying case until ready for use again.

Figure 6:
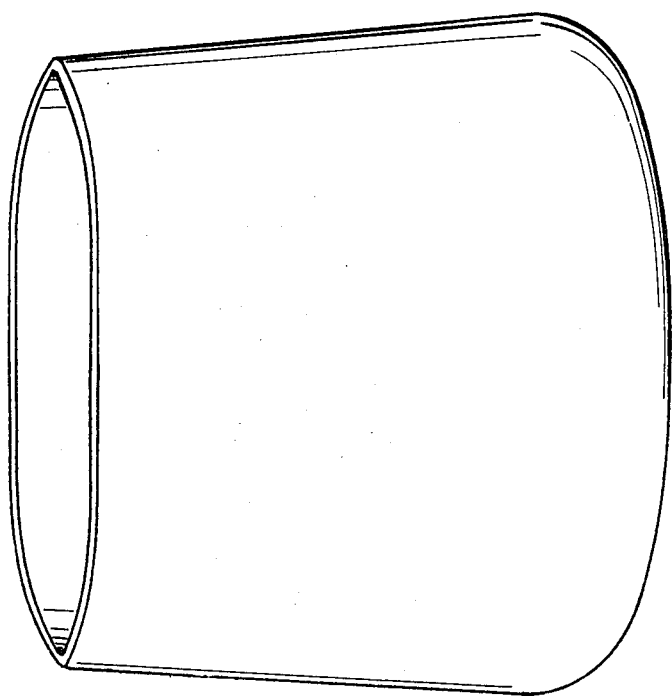
FIG. 6 is a view similar to FIG. 4 but showing another embodiment of the bag of the present invention.
Figure 8:
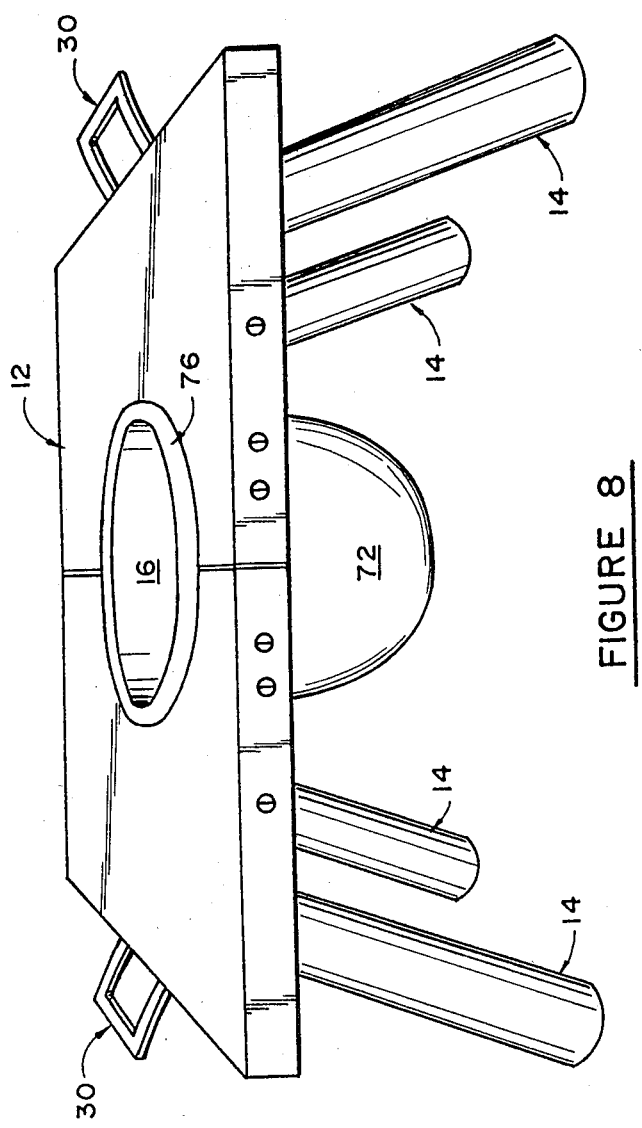
FIG. 8 is a view similar to FIG. 3 but showing the potty chair with the bag of FIG. 6.

FIG. 6 shows another embodiment of the bag of the present invention. This embodiment includes a bag denoted by the numerals 72 having an open top 74 and provided with a ring 76 at the upper end thereof. The ring can be secured to the outer periphery of the bag near the open top 74 thereof or, in the alternative, the ring could be separate from the bag. If separate from the bag, the bag can be attached to the ring by first inserting the top portion of the bag inside the ring and then folding the excess of the portion of the bag around the top of the ring so that the ring and the bag essentially become coupled together.

Figure 7:
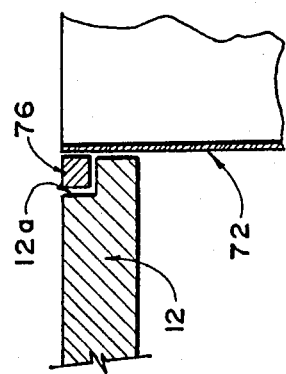
FIG. 7 is a fragmentary cross-sectional view of the potty chair using the bag of FIG. 6.

Seat member 12 is provided with an annular recess 12a surround the central opening 16 as shown in FIG. 7. This recess defines a shoulder for receiving ring 76 as shown in FIG. 7 so as to support bag 72 from the seat member 12 when the device is in use. Generally, the ring will not extend above the upper surface of seat member 12; however, even if it does, it will not interfere with the use of the potty chair. The ring 76 is shown in cross section as being square; however, it can be of other configurations, if desired.

I claim:

1. A collapsible potty chair comprising:
   a seat member including a pair of panels having respective side edges contiguous with each other, each panel having an underside and; block structure secured to the underside of each panel, respectively, the block structures having respective lower surfaces; hinge means on the lower surfaces of the block structures near said contiguous edges of the panels for hingedly mounting the panels for movement from first positions in which the panels are substantially coplanar with each other to second positions in which the panels are generally parallel with and spaced from each other, the lower surfaces of the block structures being adjacent to each other when the panels are in said second positions, said panels defining a central hole when the panels are in said first positions;
   a number of legs; means pivotally mounting the legs to respective block structures for movement of the legs from extended positions for supporting the seat member above a support surface to collapsed positions near and contiguous to the undersides of respective panels, the block structures defining recesses for receiving the legs when the legs are in their collapsed positions and when the panels are in either of their first and second positions;
   a bag having an open top; and
   tab means coupled with the seat member and extending at least partially into the central hole for removably mounting the upper margin of the bag to the seat member with the open top of the bag being in alignment with and below said hole.

2. A collapsible potty chair as set forth in claim 1, wherein said seat member has a wall at least partially surrounding and extending downwardly from said central hole, said bag having spaced openings at its upper margin, and a plurality of spaced tabs mounted on the wall and extending into the space immediately below the central hole, said tabs being removably received in the openings of the bag for mounting said bag in alignment with the central hole.

3. A collapsible potty chair as set forth in claim 1, wherein said bag mounting means include means on the seat member for forming a shoulder at least partially surrounding the central hole, the shoulder being adapted to support a ring on the upper margin of a waste container, whereby the waste container can depend from the seat member through said central hole.

4. A collapsible potty chair as set forth in claim 3, wherein is included a bag having a ring coupled thereto at the upper end thereof in surrounding relationship to the open top of the bag.

5. A collapsible potty chair as set forth in claim 4, wherein the ring is secured to the bag.

6. A collapsible potty chair as set forth in claim 4, wherein the ring is separable from the bag and the bag can be wrapped around the ring to couple the ring to the bag.

* * * * *